Sept. 11, 1928.
R. KUMMENICH
1,683,785
VOLTAGE REGULATOR
Filed Aug. 18, 1925
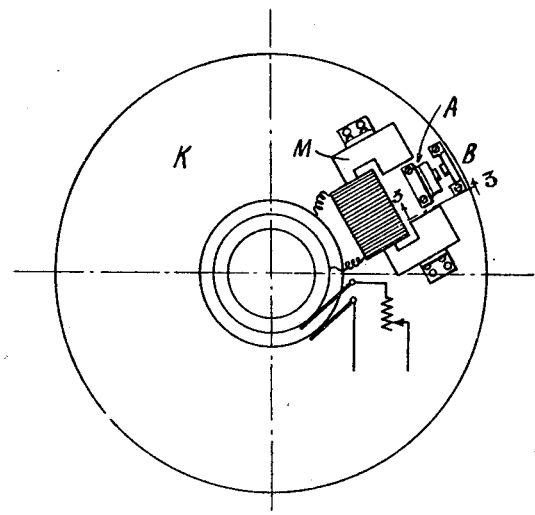
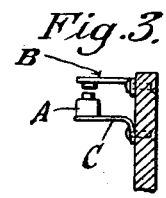
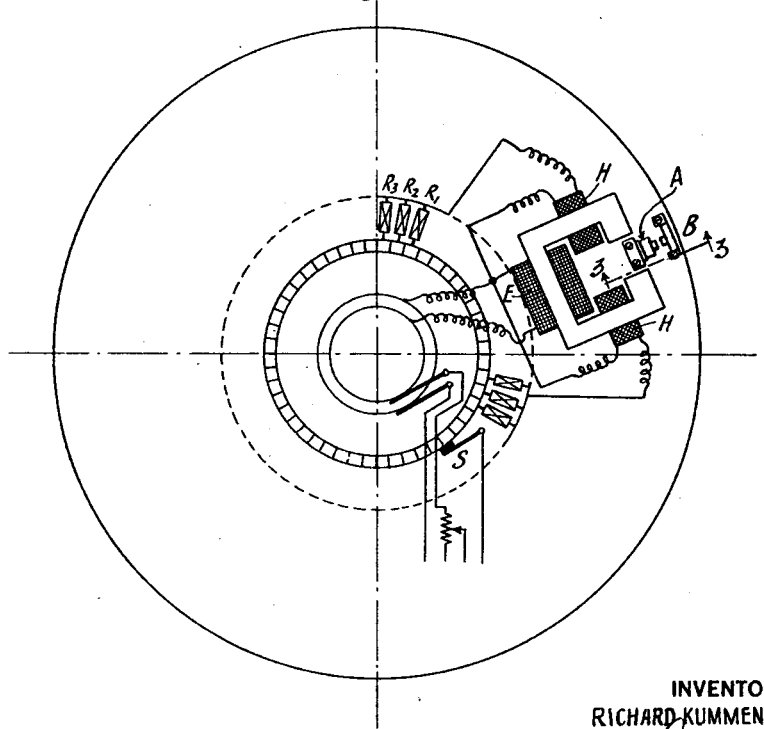
INVENTOR
RICHARD KUMMENICH
BY
ATTORNEY Patented Sept. 11, 1928.

1,683,785

UNITED STATES PATENT OFFICE.

RICHARD KUMMENICH, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY.

VOLTAGE REGULATOR.

Application filed August 18, 1925, Serial No. 51,058, and in Germany October 11, 1924.

My invention relates to a voltage regulator of the so-called Tirrill type. Such a regulator is essentially an automatic field rheostat which is adjusted by repeatedly short circuiting a fixed resistance in the field coil circuit instead of the usual method of varying the field resistance.

An object of my invention is to construct a simple regulator of the Tirrill type which is positive in its action regardless of changes in the speed of the alternator to which it is attached.

Another object of my invention is to construct a regulator of the Tirrill type that is easily adjustable without stopping the operation of the machine upon which it is placed.

Another object of my invention is to construct a regulator that will allow the speed of the alternator to be varied in a continuous manner.

Another object of my invention is to produce a regulator in which the making and breaking of the contacts occur at a different rate of speed.

Another object of this invention is to accomplish the above mentioned desired result by means of a magnetic control which control may be variable if so desired.

Still another object of my invention is to construct a regulator which will maintain a state of indifferent equilibrium between contact members regardless of the speed of rotation of the alternator to which the regulator is attached.

Further objects will appear after consideration of the specification and figures here presented.

Fig. 1 is a representation of a regulator involving my invention.

Fig. 2 represents a slightly different form of regulator embodying my invention.

Fig. 3 is a view along line 3—3 of Figs. 1 and 2 showing a possible means for supporting the contact element from the disc K.

Generally speaking centrifugal-force regulators which operate in conformity with the so-called Tirrill principle utilize the elastic force of a steel spring for the compensation of the centrifugal-force, while gravity furnishes the controlling force, by the action of which upon each revolution a contact is caused to be opened and closed. In some types of regulator (for instance, in the Giebe regulator) the balance or equilibrium between centrifugal and spring force is totally or nearly indifferent, whereas in others it is extremely stable.

The nature of the equilibrium would be immaterial if for the breaking of the contact an infinitely small distance had to be covered, and if an infinitely short length of time were required therefor. However, in the absence of such ideal apparatus the nature of the equilibrium happens to play an important part, indeed, the indifferent equilibrium is most suitable and favorable.

But all of these systems are characterized by a great disadvantage, namely, that for the adjustment of the contact springs the machine has to be stopped every time adjustment is required. Further, the speed of rotation can not be varied in a continuous manner, and this is often necessary.

Since the spring force owing to temperature fluctuations and permanent changes varies from day to day, occasional or frequent readjustment of the spring becomes imperative. This is a very tedious task on account of the fact that the machine must be stopped every time an adjustment is made, not to speak of the fact that in the cases where a plurality of such springs co-act, correct adjustment is almost a physical impossibility.

Mechanical devices, in which the distance between the bearing contact and the axis adjustment or setting is varied from the outside, can be resorted to only in the case of less favorable stable equilibrium, not to mention that they are rather complicated, and that they have to be specially designed to fit the conditions of any given spring.

The systems heretofore known, have still further a common disadvantage, namely, that gravity is used as the controlling force, a quantity which is invariable both as regards its value as well as—and this is a more serious consideration—in regard to its time-shape. The sinuous action of gravity, to be sure, in connection with an ideal apparatus as above referred to would be best suited, but it is least appropriate for apparatus of the kind physically available. In this case, the interruption and closing of the contacts as to length of time required is not alike, on the contrary, the receding of the contact spring should be accomplished at a more rapid rate of speed than the approaching movement on account of the arc set up on breaking.

Now, in conformity with the present invention the shortcomings as before enumerated are obviated by utilizing the attractive force of a magnet, alone or in conjunction with a supplementary spring-force for the compensation of the centrifugal-force due to rotation of the alternator.

According to a further development of the idea underlying the invention, a variable magnetic force is used as the controlling force in lieu of, or else in addition to, the force of gravity.

Referring to accompanying drawings which show by way of example an arrangement conformably with the invention, Fig. 1 showing a scheme without, and Fig. 2 a scheme including, a device adapted to the periodical variation of the force of attraction.

Upon the motor shaft is seated a circular disk K which carries a bypolar electromagnet M in the neighborhood of the periphery thereof. A movable armature A mounted on a spring element C secured to the disc K is placed between the poles of the magnet M and a relatively stationary contact B is secured to the disk K near the periphery thereof and opposite the poles of the magnet M. Normally during operation of the alternator A and B are held in contact with each other by the centrifugal-force due to the rotation of the disk K, however, when the magnet M is energized by an electric current, the armature A will be withdrawn from contact with the element B. The current to energize the magnetizing coil of the magnet M is fed by way of two slip rings connected to the armature of the alternator in a customary manner.

By the aid of an externally arranged series resistance (rheostat) the current and consequently the attractive force of the magnet can be adjusted at will so that regardless of the speed of revolution, balance can be established between the centrifugal-force and the attractive force of the magnet.

The electromagnet can be replaced by a permanent magnet which may be provided with a small winding in order to be able to vary the force exerted thereby.

A normal type of magnet may not be used for the purpose hereinbefore mentioned inasmuch as the same would result in an extremely unstable state of equilibrium between the centrifugal and the magnet forces.

For the purpose of establishing an indifferent equilibrium, the armature A may either be united with an additional leaf-spring, or, better still, the pole piece surfaces of the magnet and the armature A may be given such a shape that the force of attraction is proportional to the distance from the axis. This property or condition is attained by giving the armature, for instance, a shape as illustrated in Fig. 1. The armature and the field poles can be formed of either prismatic or cylindrical configurations.

As the controlling force is not the force of gravity, but the attractive force of the magnet it may periodically be changed either by the main exciting coil E, or else by means of special auxiliary coils H in a convenient manner as indicated by Fig. 2.

For this purpose a commutator is fitted upon the axis or shaft whose segments are so connected with resistances $R^1$, $R^2$, $R^3$, etc., that the current in the auxiliary coils H which is causative of an increase or a decrease of the force of attraction is given the desired time-shape. If several magnets are mounted upon the disk, only as many commutator brushes S should be fitted on at angular intervals or distances as there are magnets.

Having described my invention what I claim is:—

1. A regulator comprising a rotating disk, a relatively stationary contact element, a relatively movable contact element carried by said disk and magnetic means for controlling the movement of said movable contact member, and means for varying the effect of said magnetic means.

2. A regulator comprising a rotating disk, a relatively stationary contact member secured to said disk, a relatively movable contact member secured to said disk, electromagnetic means for controlling the movement of said movable contact member, and means for varying the effect of said electromagnet, said varying means comprising a secondary coil and resistance elements.

3. A regulator comprising a rotating disk, a relatively stationary contact member secured to said disk, a relatively movable contact member secured to said disk, electromagnetic means for controlling the movement of said movable contact member, and means for varying the effect of said electromagnet, said varying means comprising a secondary coil and resistance elements, further characterized by, said varying means being adjustable while said regulator is in operation.

4. In a regulator, a rotating element, a pair of contacts mounted thereon, one of said contacts adapted to be actuated by centrifugal force and magnetic means for controlling at all times the effect of the centrifugal force on the contact adapted to be actuated by centrifugal force.

5. In a regulator, a rotating element, a pair of contacts mounted thereon, said contacts adapted to be closed by the action of centrifugal force, magnetic means adapted to counteract partially the effect of the centrifugal force and additional magnetic means adapted to act during a fraction of a rotation of said rotating element, on one of said contact members.

6. A speed regulating device comprising a rotating disk, contact devices mounted thereon comprising a relatively stationary member and a relatively movable member, magnetic means for affecting said movable member and means controlled by the speed of rotation of said disk for partially counteracting the effect of said magnetic means.

RICHARD KUMMENICH.